United States Patent
Bagatelos (10) Patent No.: US 8,898,969 B2
(45) Date of Patent: Dec. 2, 2014

(54) NET-ZERO ENERGY CURTAIN WALL

(71) Applicant: Bisem, Inc., Sacramento, CA (US)

(72) Inventor: Nicholas Peter Bagatelos, Sacramento, CA (US)

(73) Assignee: Bisem, Inc., Sacramento, CA (US)

(*) Notice: Subject to any disclaimer, the term of this patent is extended or adjusted under 35 U.S.C. 154(b) by 0 days.

(21) Appl. No.: 13/888,350

(22) Filed: May 6, 2013

(65) Prior Publication Data
US 2014/0026499 A1 Jan. 30, 2014

Related U.S. Application Data

(60) Provisional application No. 61/643,204, filed on May 4, 2012.

(51) Int. Cl.
*E04B 2/90* (2006.01)
*H01L 31/042* (2014.01)

(52) U.S. Cl.
CPC .............. *E04B 2/90* (2013.01); *H01L 31/0422* (2013.01); *Y02E 10/50* (2013.01)
USPC .......................................... 52/173.3; 52/235

(58) Field of Classification Search
CPC ............... E04B 2/88; E04B 2/90; E04B 2/96; E04B 2/967; E04B 2/885
USPC ..................... 52/235, 507–510, 404.1, 204.6, 52/200–202, 204.61, 173.3, 52/506.03–506.06
See application file for complete search history.

(56) References Cited

U.S. PATENT DOCUMENTS

| | | | |
|---|---|---|---|
| 2,724,465 A | 11/1955 | Krauss et al. | |
| 2,914,145 A | 11/1959 | Benson | |
| 4,483,122 A * | 11/1984 | Crandell | 52/747.1 |
| 5,522,193 A * | 6/1996 | Sommerstein et al. | 52/235 |
| 7,043,884 B2 | 5/2006 | Moreno | |
| 7,162,842 B2 * | 1/2007 | Ribic | 52/235 |
| 7,676,999 B2 * | 3/2010 | Arias | 52/235 |
| 7,707,796 B2 * | 5/2010 | Arias | 52/745.09 |
| 7,845,126 B2 * | 12/2010 | Brescia | 52/235 |
| 7,845,127 B2 * | 12/2010 | Brescia | 52/235 |
| 7,847,181 B2 * | 12/2010 | Brescia | 136/244 |
| 7,922,224 B2 * | 4/2011 | Arias | 292/302 |
| 8,033,066 B2 * | 10/2011 | Griffiths | 52/235 |
| 8,171,680 B2 * | 5/2012 | Brescia | 52/173.3 |
| 8,590,263 B2 * | 11/2013 | Brescia | 52/745.1 |
| 2011/0179726 A1 | 7/2011 | Pao et al. | |
| 2011/0258945 A1 * | 10/2011 | Arbour | 52/173.3 |
| 2012/0085042 A1 | 4/2012 | MacDonald et al. | |

OTHER PUBLICATIONS

International Search Report issued Aug. 23, 2013 in PCT/US2013/039788.

* cited by examiner

*Primary Examiner* — Jeanette E Chapman
(74) *Attorney, Agent, or Firm* — David H. Jaffer; Pillsbury Winthrop Shaw Pittman LLP (57) ABSTRACT

Curtain walls according to embodiments of the present disclosure integrate a variety of energy producing and/or energy saving features and may be used to clad buildings to achieve net zero energy or low energy ratings. A curtain wall may comprise: a support frame; a grid assembly attached to the support frame; and, panels and cassettes each comprising a prefabricated unit attached to a frame; wherein the assembly is configured for ease of attachment of the frames carrying the prefabricated units. A wide range of different panels and cassettes with different functions can be integrated into the curtain wall, such as glazing, electrochromic, solar, photovoltaic (PV) and aluminum.

18 Claims, 11 Drawing Sheets

NET-ZERO ENERGY CURTAIN WALL

CROSS-REFERENCE TO RELATED APPLICATION

This application claims priority to U.S. Provisional Application No. 61/643,204, filed May 4, 2012, the contents of which are incorporated herein by reference in their entirety.

FIELD OF THE INVENTION

The present invention relates generally to curtain walls for buildings, and more particularly to curtain walls for low or net-zero energy buildings.

BACKGROUND OF THE INVENTION

A curtain wall system is an outer covering of a building where the outer walls are typically not critical from a structural stability standpoint, but provide environmental protection and/or serve specific architectural purposes. Curtain walls can be made of glass, metal (e.g., steel, aluminum, copper etc.), fiber glass, etc., or a combination thereof. Often curtain wall systems are too rigid to accommodate a variety of functionalities, and constrained by the functionality that the system is originally designed for. Once installed, there is very little opportunity to make the curtain wall adjust to any new configuration that is not originally planned. Conventional curtain wall systems do not offer a design that is suitable for optimizing overall energy consumption footprint of an existing building.

What is needed is a flexible design for curtain walls and associated framework which can address and solve the above-mentioned shortcomings of the conventional curtain wall systems.

SUMMARY

The modular grid design of the present disclosure allows easy installation of prefabricated cassettes and panels forming a curtain wall with enhanced functional and/or structural capabilities, particularly the capability to optimize the overall energy consumption footprint of an existing building, such as for a net-zero energy building.

The modular design accommodates a wide range of different panels/cassettes with different functions. Examples of panels/cassettes include, but are not limited to vision glass, electrochromic, solar, photovoltaic (PV), aluminum, spandrel, and sunlighting cassettes. The cassettes may include a heat exchange panel as well, where the heat exchange panel is connected to a temperature control system of a building to make the building more energy efficient; air/water flow distribution may be integrated into panels of the curtain wall for heat exchange. Furthermore, the curtain wall of the present invention may readily accommodate a thermal siphon plenum.

According to certain embodiments of the present invention a curtain wall may comprise: a support frame; a grid assembly system attached to the support frame; and, panels and cassettes each comprising a prefabricated unit attached to a frame. The grid assembly system is configured for ease of attachment of said frames carrying said prefabricated units.

The support frame may comprise tube steel or steel studs and a curtain wall sheathing is located between the grid assembly system and the support frame. The grid is configured to allow panels/cassettes to be attached or removed without disturbing surrounding panels/cassettes. Furthermore, areas of the curtain wall may be preassembled before attaching to the exterior of a building. The curtain wall may include water proofing gaskets and electrical supply distribution that support the modular configuration.

According to further embodiments of the present invention, a method of assembling a curtain wall for an energy efficient building may comprise: providing a support frame; attaching sheathing to the exterior side of the support frame; applying an exterior waterproofing membrane to the exterior side of the sheathing; attaching a grid assembly system to the support frame, the sheathing being positioned between the support frame and the grid assembly system; and attaching a multiplicity of cassettes and panels to the grid assembly, the cassettes and panels each comprising a prefabricated unit attached to a frame; wherein the grid assembly system comprises horizontal metal struts configured to couple with hooks attached at top and bottom edges of each of the frames of the panels and cassettes and wherein the grid assembly system comprises vertical metal struts with steel pins, each of the steel pins comprising a cylindrical end and a spring-loaded plunger, the vertical metal struts with steel pins being configured to engage with the frames of the panels and cassettes, the cylindrical end being captured in a locking slot of the frame and the spring-loaded plunger being captured by a circular aperture in the frame.

BRIEF DESCRIPTION OF THE DRAWINGS

The above and other aspects and features of the present disclosure will become apparent to those ordinarily skilled in the art upon review of the following description of specific embodiments of the disclosure in conjunction with the accompanying figures, wherein.

Persons skilled in the art will appreciate that the illustrative figures are not limiting to the scope of the disclosure.

DETAILED DESCRIPTION

Embodiments of the present disclosure will now be described in detail with reference to the drawings, which are provided as illustrative examples of the disclosure so as to enable those skilled in the art to practice the disclosure. Notably, the figures and examples below are not meant to limit the scope of the present disclosure to a single embodiment, but other embodiments are possible by way of interchange of some or all of the described or illustrated elements. Moreover, where certain elements of the present disclosure can be partially or fully implemented using known components, only those portions of such known components that are necessary for an understanding of the present disclosure will be described, and detailed descriptions of other portions of such known components will be omitted so as not to obscure the disclosure. In the present specification, an embodiment showing a singular component should not be considered limiting; rather, the disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

Curtain walls according to embodiments of the present disclosure which integrate a variety of energy producing and/or energy saving features may be used to clad buildings to achieve net zero energy or low energy ratings. Furthermore, these curtain walls are configured for ease of construction and installation, resulting in achieving overall cost-efficiency depending on the level of performance and/or versatility desired for the built environment.

Figure 1A:
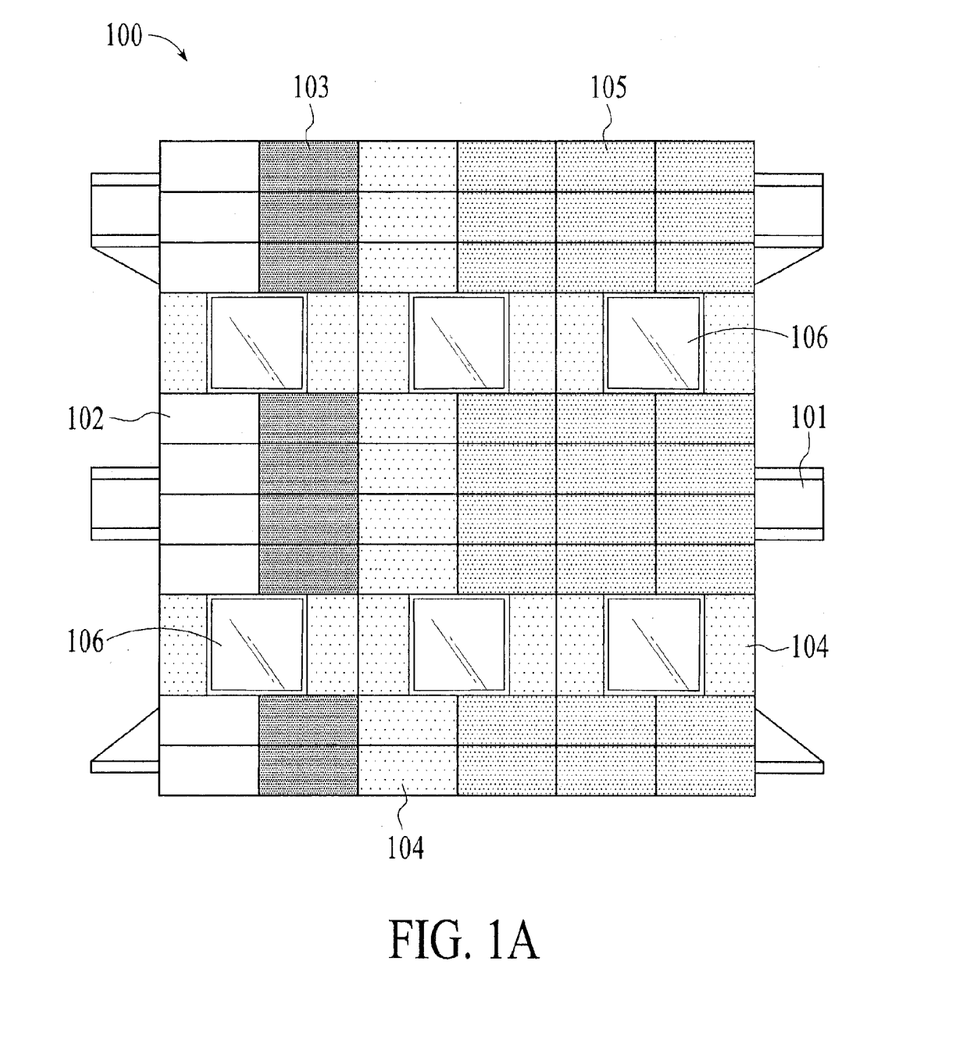
FIG. 1A illustrates a front elevation of a curtain wall with the floor decks in the back, according to some embodiments of the present disclosure.

FIG. 1A shows a front elevation of a curtain wall according to some embodiments of the present disclosure. The curtain wall 100 is shown with a variety of panels and cassettes including heat exchange panels (102), spandrel panels (103), aluminum panels (104), photovoltaic (PV) panels (105) and vision glass cassettes (106). Persons skilled in the art will appreciate in view of the present disclosure that the scope of the invention is not limited by what type of panel is used, as long as the panels are fabricated in a manner that can be assembled/integrated into the grid assembly system as described in further detail below. The floor decks 101 are seen behind the curtain wall. In this example, the solar energy converted to electricity by the PV panels may be connected to the building's electrical grid.

Furthermore, some panels may be used for heat exchange—according to some embodiments of the present disclosure duct work for air and/or pipes for water may be integrated into curtain walls for providing hot water and HVAC (heating, ventilation and air conditioning) functions. The spandrel areas of a curtain wall may be suitable for this heat exchange function.

Figure 1B:
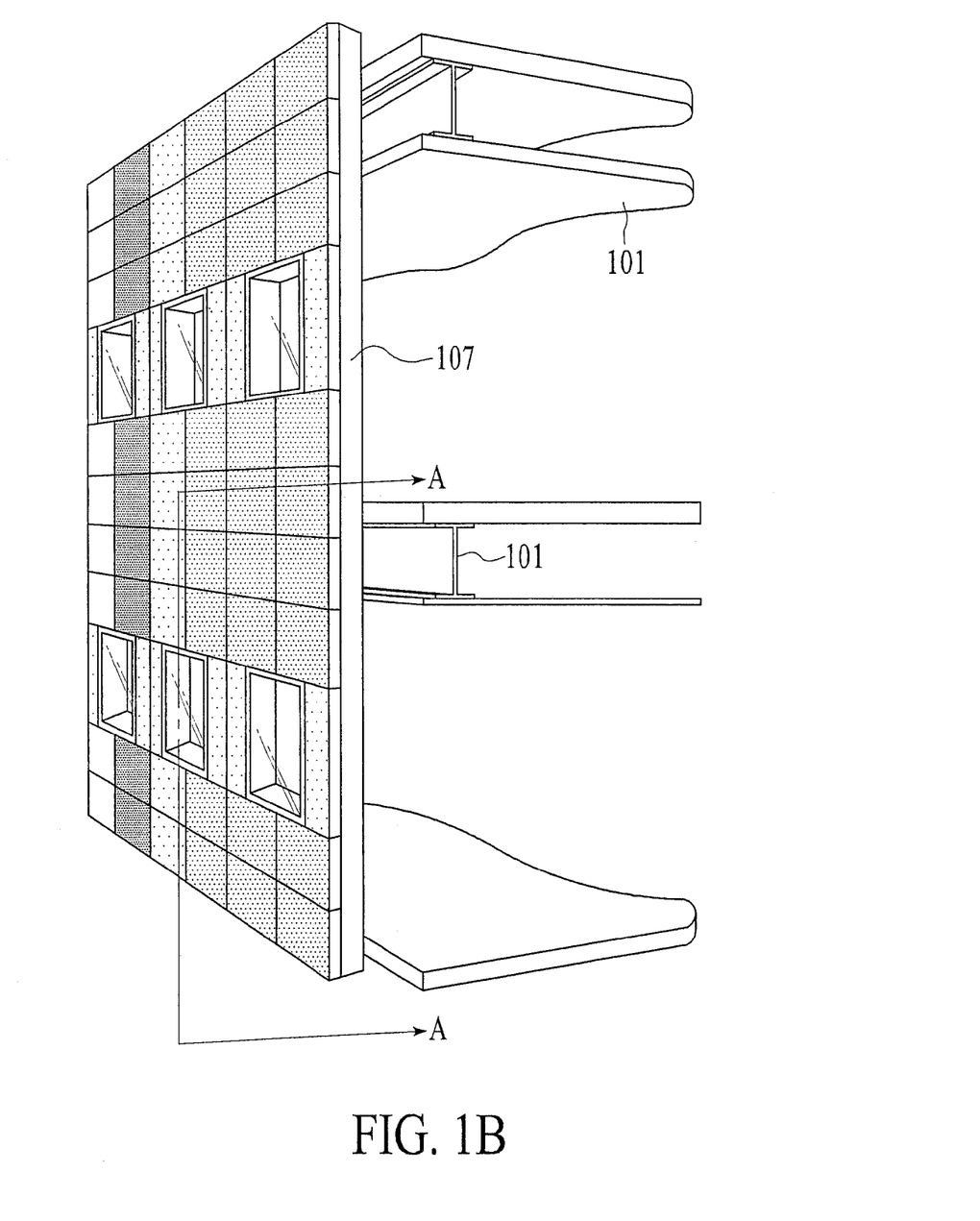
FIG. 1B illustrates an alternate view of the curtain wall shown in FIG. 1A, showing the floor decks.

FIG. 1B shows an alternate view of the curtain wall 100 and floor decks 101 and the interior portion of the curtain wall 107.

Figure 1C:
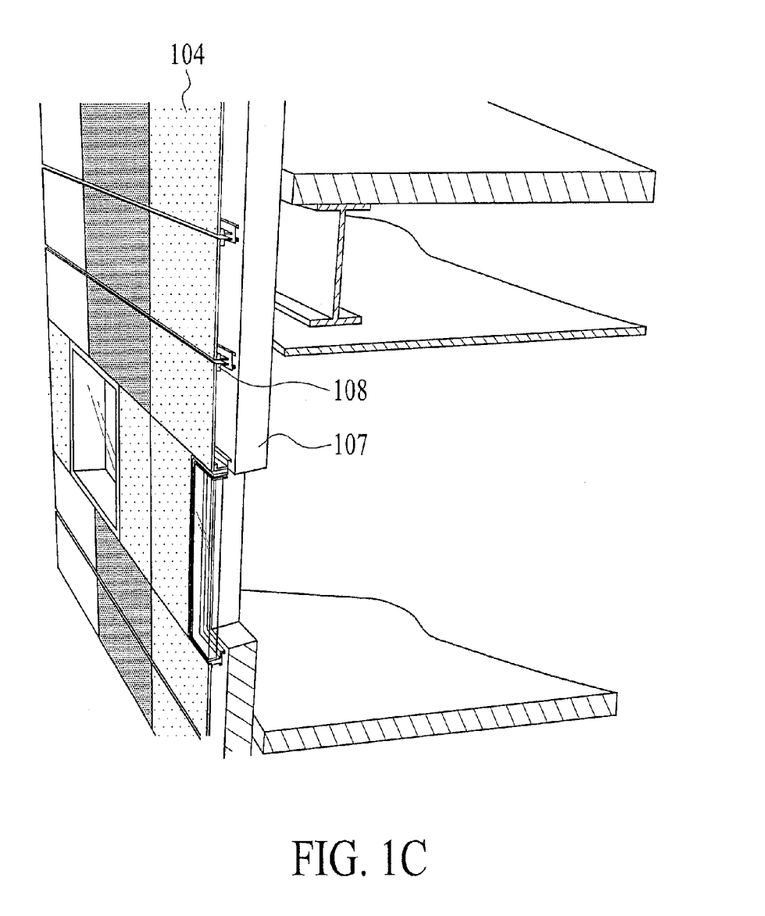
FIG. 1C illustrates a cut through elevation of the curtain wall of FIGS. 1A and 1B.

FIG. 1C shows a cut through elevation of the curtain wall 100 of FIG. 1A. The panels and cassettes can be seen attached to a metal grid assembly 108, which is attached to the interior portion of the curtain wall 107. The floor deck placement is also shown. Specifically, the cutline A-A shown in FIG. 1B runs through a vision glass cassette, with different size and type of panels/cassettes surrounding the vision glass cassette.

Figure 2:
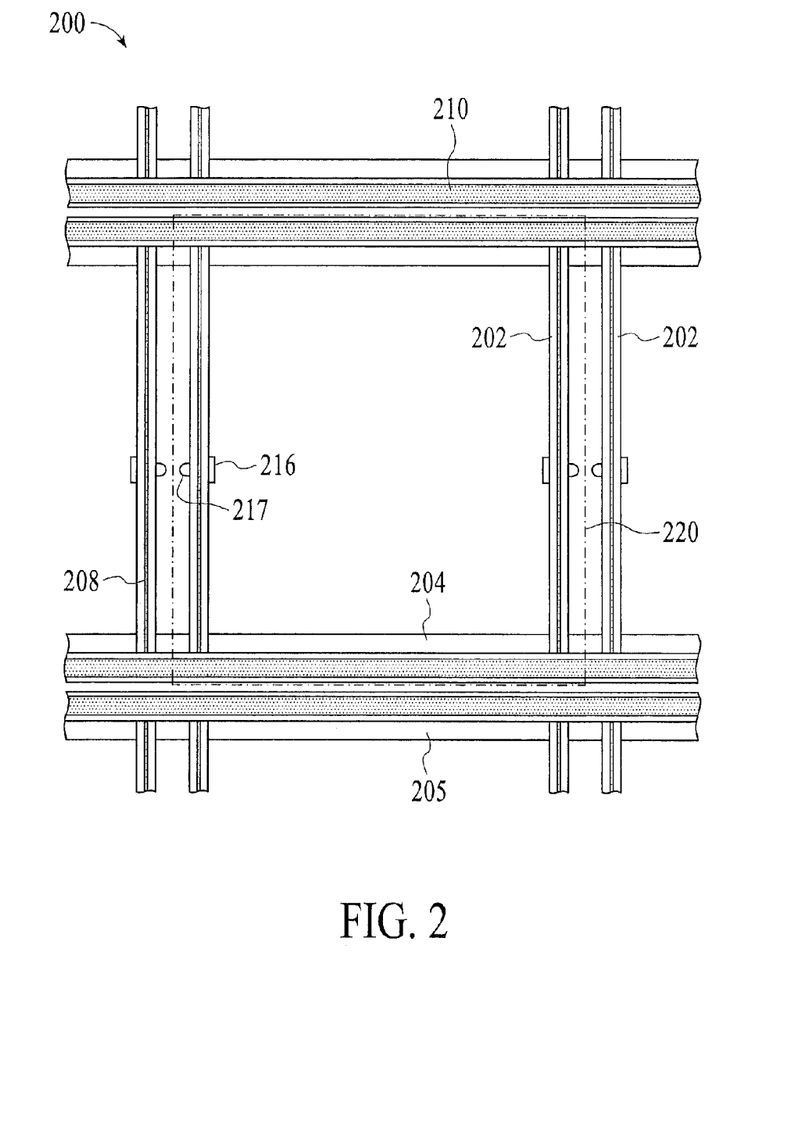
FIG. 2 schematically illustrates a front view of a grid assembly system, according to embodiments of the present disclosure.

FIG. 2 schematically shows a section of a grid assembly system 200. The outer edges of a panel or cassette where it would attach to the grid assembly system is shown by dashed line 220. The grid assembly system is comprised of upper and lower horizontal members, 204 and 205, respectively, and vertical members 202. The grid assembly system comprises multiple sections, such as the section shown in FIG. 2, such that multiple panels and cassettes may be attached to the grid assembly system to form the exterior of the curtain wall as shown in FIGS. 1A-1C.

Figure 3A:
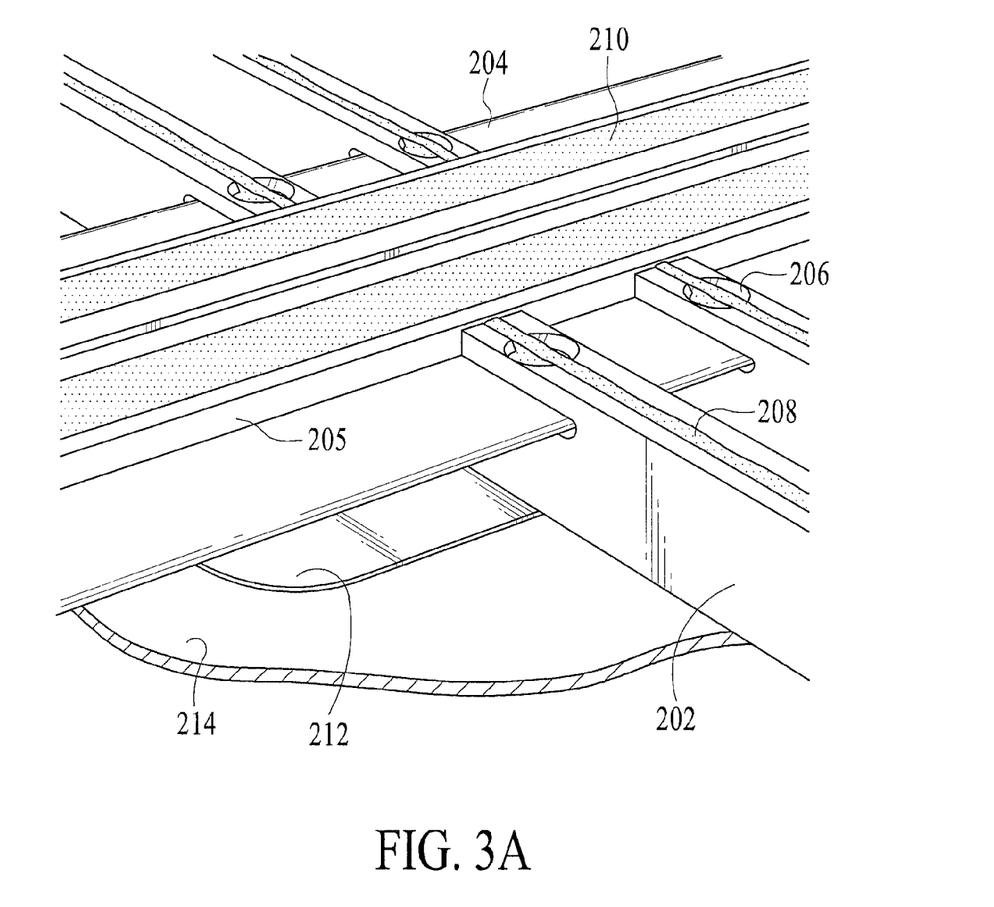
FIG. 3A illustrates a perspective view of a first detail of the grid assembly system of FIG. 2, according to embodiments of the present disclosure.

FIG. 3A shows a first detail of the grid assembly system 200, with shimming, a waterproof membrane, and a gasket system. The vertical (202) and horizontal (204, 205) components of the grid assembly system are attached to each other using rivets (not seen) at the machined holes 206. The vertical and horizontal components may comprise metal struts, such as aluminum struts. Gaskets 208 and 210 run atop the vertical and horizontal components of the grid assembly system, respectively. FIG. 3A also shows the shim 212 resting on top of a waterproofing membrane 214. The gaskets ensure snug (and possibly waterproof) attachment of the panels and cassettes to the grid assembly system.

Figure 3B:
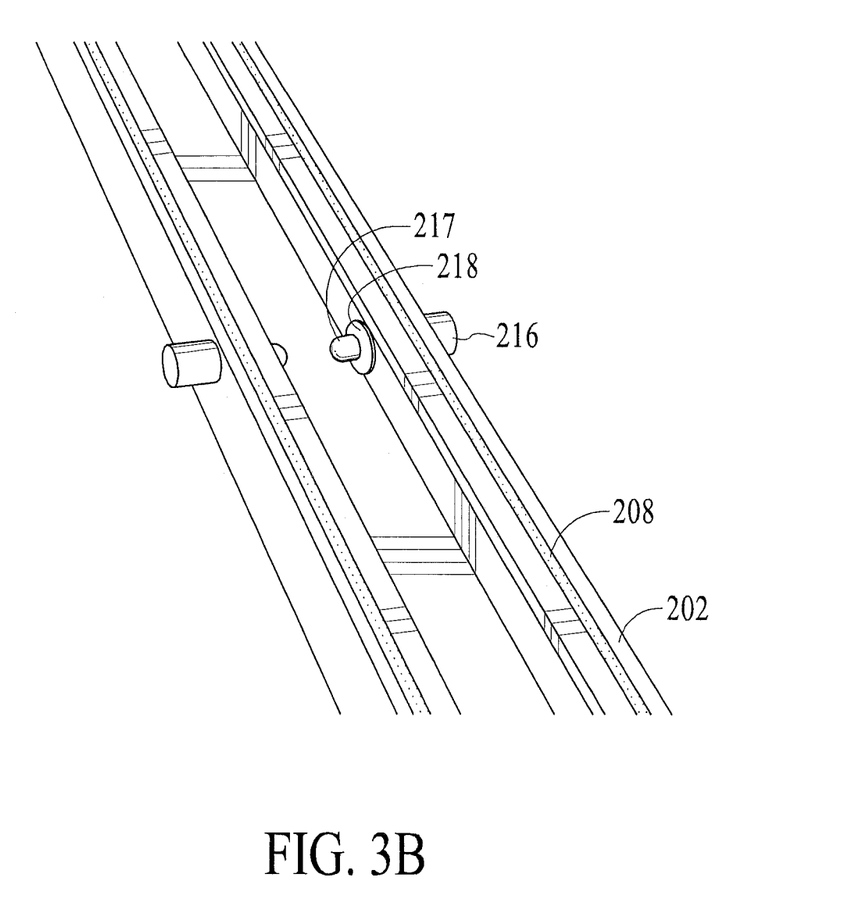
FIG. 3B illustrates a perspective view of a second detail of the grid assembly system of FIG. 2, according to embodiments of the present disclosure.

FIG. 3B shows a second detail of the grid assembly system 200, including pins attached to the metal struts for ease of installation and removal of panels and cassettes. The pins, may be stainless steel pins or pins of other suitable material. The gasket 208 is also seen in this figure. Each pin comprises a cylindrical end 216, a spring-loaded plunger 217 and a collar 218; the spring-loaded plunger moving relative to the fixed collar and cylindrical end. The vertical metal struts with the steel pins are configured to engage with the frames of the cassettes and panels as will be described in more detail below.

Figure 4:
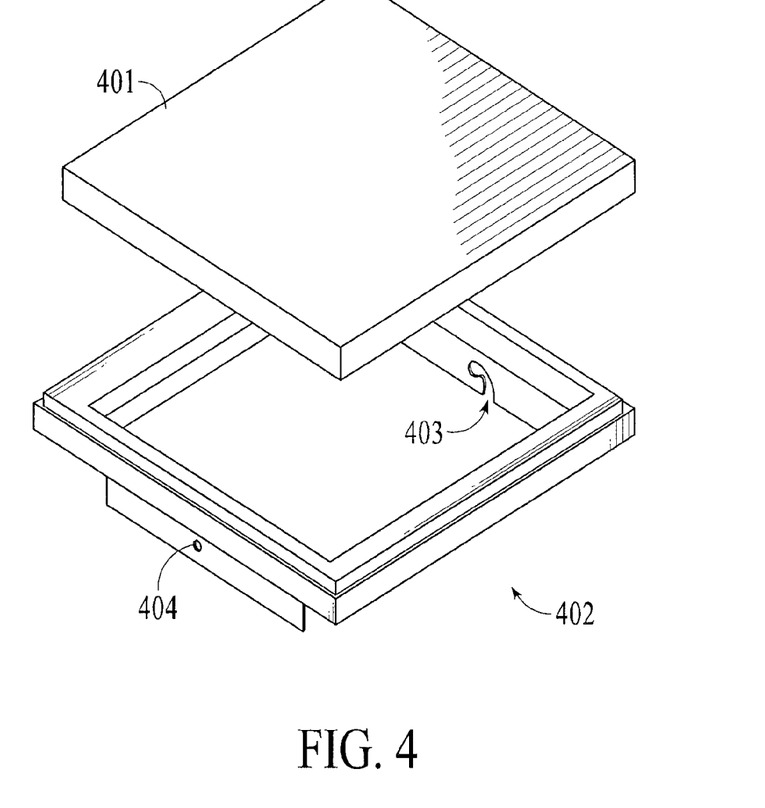
FIG. 4 illustrates an exploded view of a cassette, according to embodiments of the present disclosure.

FIG. 4 shows an exploded view of a cassette according to some embodiments of the present disclosure. A cassette or panel unit 401, such as a PV unit, fits into a frame 402. The frame mates with the grid assembly system as will be described immediately below in part, and also below with reference to FIG. 6. The pins, shown in FIGS. 2 and 3B, which are attached to the vertical components of the grid assembly, mate with the features 403 and 404 in the frame. Specifically, the cylindrical end of the pin 216 is captured in the locking slot 403 and the spring-loaded plunger 217 is captured by the circular aperture 404. Due to the perspective view, only one slot and one aperture are seen. However, there are two apertures 404 positioned on the outer faces 405 of the frame corresponding to the positions of the spring-loaded plungers 217 and two slots 403 positioned on the inner faces 406 of the frame corresponding to the positions of the cylindrical ends of the pins 216—see FIG. 2 and FIGS. 5A & 5B. Note that when a panel or cassette is attached to the grid assembly system the opening of the slots 403 are placed over the cylindrical ends of the pins and the panel or cassette is moved downwards to capture the cylindrical ends in the blind ends of the slots.

Figure 5A:
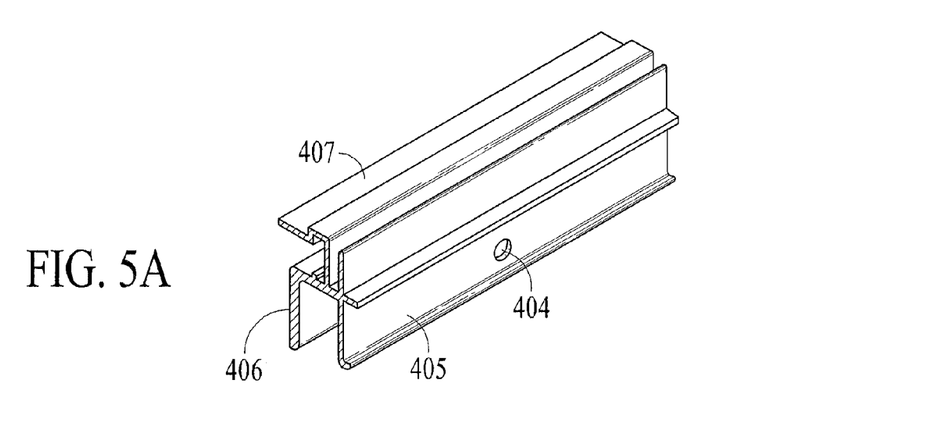
FIGS. 5A-5C illustrate detailed views of a locking slot and retaining aperture in the frame of a cassette, according to embodiments of the present disclosure.
Figure 5B:
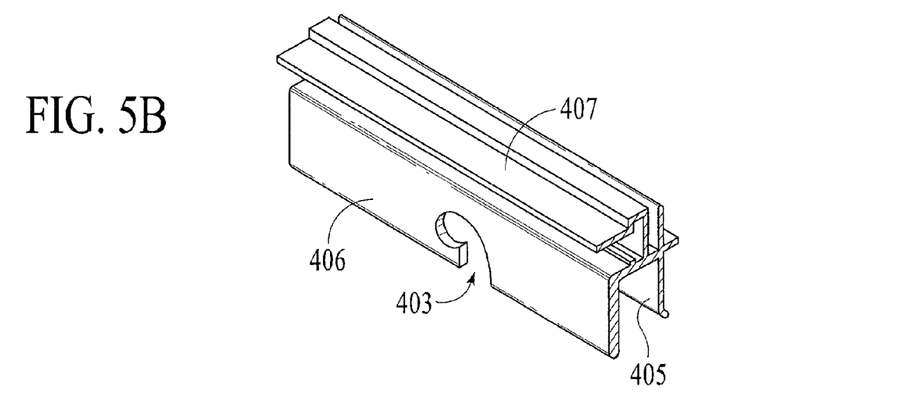
Figure 5C:
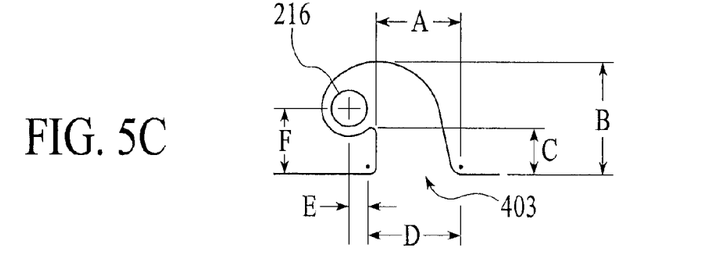

FIGS. 5A-5C show more detailed views of the locking slots 403 and circular apertures 404 in the frame. Example values of the dimensions A, B, C, D, E and F may be $9/16$, $49/64$, $21/64$, $5/8$, $1/8$ and $29/64$ of an inch respectively. The dimension of the component 216 is such that it can be captured by the curved part of the locking slot 403. The upper part of the frame 407 is configured for attachment of the units 401.

It is to be understood that the design of the plunger/locking slots are not limited by particular dimensions, but the dimensions should be commensurate with the intended functionality of the elements to achieve the fastening/coupling action between various components.

Figure 6:
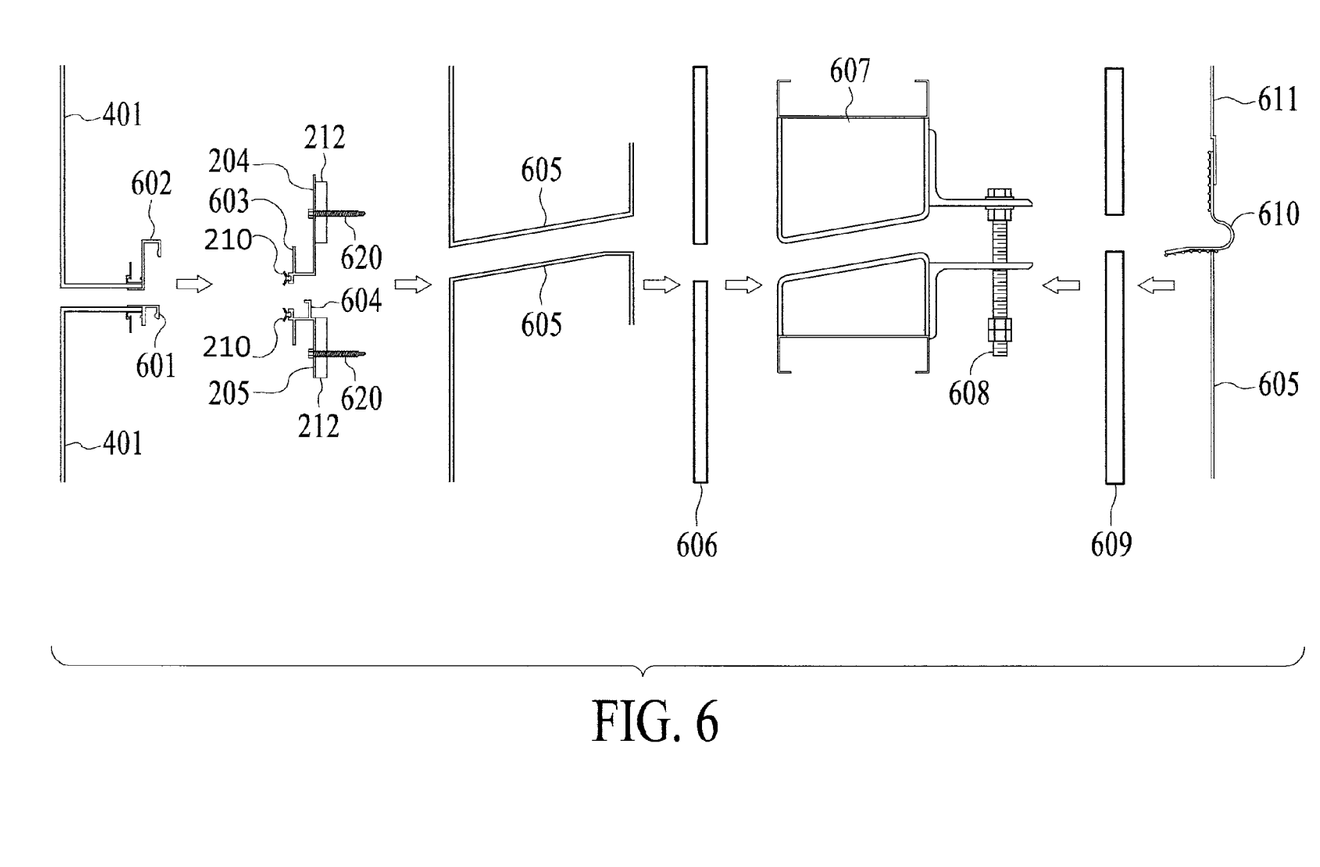
FIG. 6 illustrates an example of a curtain wall assembly sequence, according to an embodiment of the present disclosure.

FIG. 6 illustrates an example of a curtain wall assembly sequence. The sequence of assembly is shown for illustrative purposes. The sequence of the steps in the assembly may be altered, and one or more steps can be added/deleted/rearranged based on the end goal or a particular implementation. In the example sequence shown, on the exterior side of the curtain wall, a curtain wall sheathing and/or rigid insulation 606 is attached to the steel support frame 607, followed by the exterior waterproofing membrane 605, the aluminum grid assembly system, by bolts or screws 620, and lastly the prefabricated exterior panels and cassettes. The position of the shims 212 are shown in the figure. An example of a curtain wall sheathing panel is commercially known as DensGlass®, available in the US from Georgia-Pacific Gypsum LLC of Atlanta, Ga. On the interior, dry wall 609 is attached to the steel support frame 607 followed by a joining/sealing mechanism 610 and 611, such as, a continuous silicone joint seal, silicone sleeve, or, an ethylene propylene diene monomer (EPDM) gasket. The steel support frame 607 is anchored to the building floor decks 101 by the indexing lugs 608. As is obvious from the enclosed figures, there will not be any DensGlass® panels or other type of sheathing in the curtain wall where the windows are located—in other words, the curtain wall will have interior openings to accommodate the windows.

In more detail, with reference to FIG. 6, the units 401 are attached to the grid assembly system by hooks 601 and 602 attached at the top and bottom edges, respectively, of the frame 402. The hooks 601 and 602 engage with receiving features 604 and 603, respectively. The receiving features 604 and 603 are part of the upper and lower horizontal members 205 and 204, respectively. The receiving features 604 and 603 have vertical "lips" which function to capture the corresponding hooks on the panels and cassettes. These attachment means are used in conjunction with the steel pins described above, such that the hooks at top and bottom of the panel or cassette are lifted over the receiving features 603 and 604 and the cassette or panel is then pushed down to lock the panel or cassette in place with the steel pins as described above. The hooks 601 and 602 and receiving features 603 and 604 are linear structures that extend into the plane of the figure. The gaskets 210 keep the panels and cassettes securely positioned when locked in place. The panels and cassettes can be removed by reversing the process—the panel or cassette is pushed up to unlock the pins and then lifted off the receiving features 603 and 604. The ease of removal allows panels and cassettes to be changed out without disturbing adjacent panels and cassettes.

Persons skilled in the art will understand that the material used for the support frame, the grid assembly, the waterproofing membrane, the gasket, the sheathing and even the panels/cassettes themselves are for illustrative purposes only, and are non-limiting to the scope of the invention.

Figure 7:
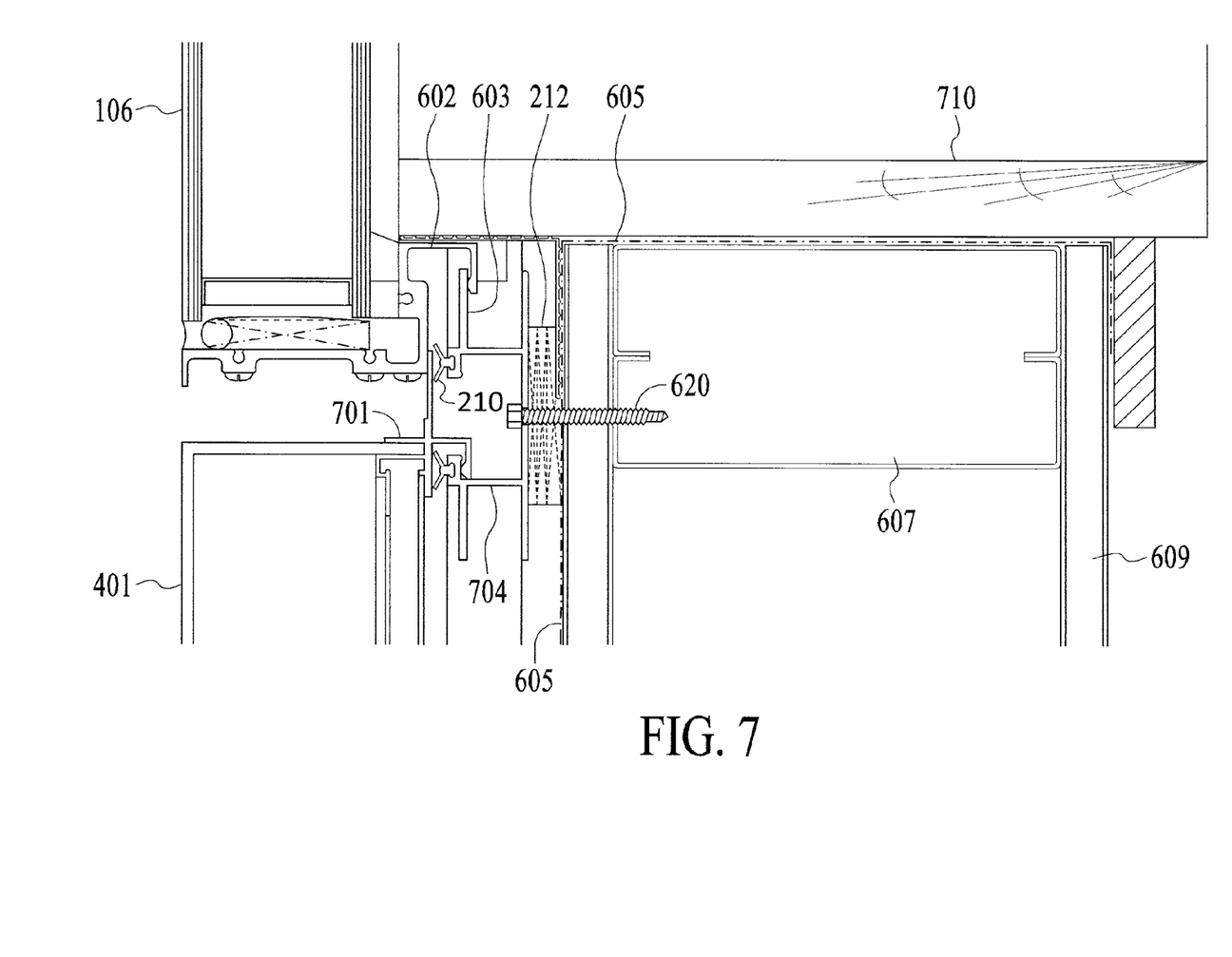
FIG. 7 illustrates a cross-sectional representation of a curtain wall showing the waterproofing on exterior, interior and join areas, according to an embodiment of the present disclosure.

FIG. 7 shows a cross-section through a curtain wall including an R-20 vision glass cassette and panel cassettes; a wood block interior reveal 710 is shown around the window. The features are as described above in FIG. 6, although the structure of the hook 701 and corresponding receiving feature 704 are different to the hook and receiving feature of FIG. 6—this is to accommodate the vision glass unit 106 in the cassette above.

Figure 8:
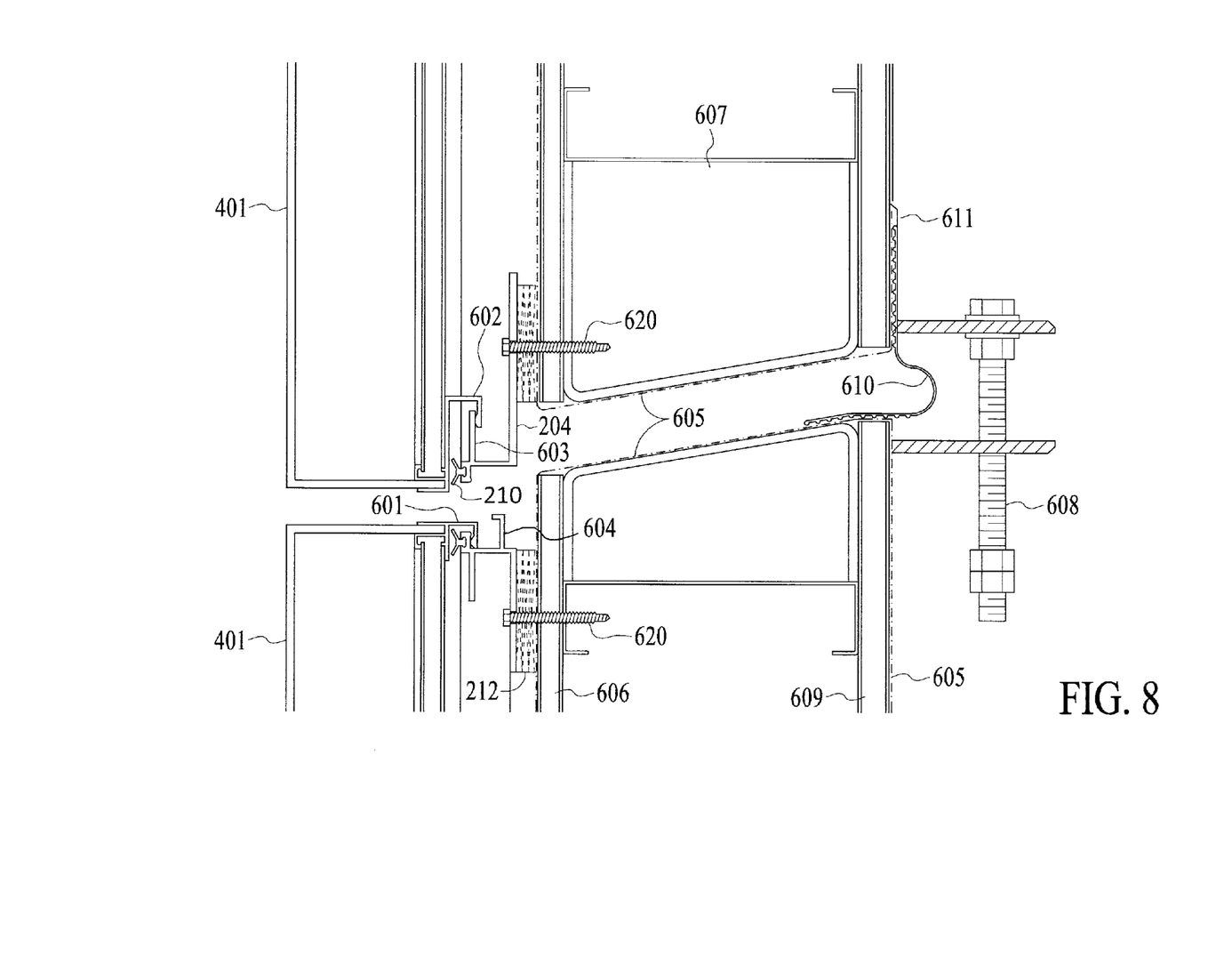
FIG. 8 illustrates a cross-section through a curtain wall including a vision glass cassette and other cassettes with a wood block interior around the window, according to an embodiment of the present disclosure.

FIG. 8 shows a cross-sectional representation of a curtain wall illustrating the waterproofing on exterior, interior and joint areas. The curtain wall is configured to ensure that moisture from the interior surfaces of the assembly drains to the exterior. The features are as described above in FIG. 6.

As mentioned previously, the curtain wall of the present disclosure can be made to improve the thermal efficiency of the building. The space between the back of the grid assembly and the waterproofing membrane (which covers the sheathing), may trap hot air, which rises up the inside of the curtain wall. The trapped hot air may be siphoned off at the top of the wall and used for heating the building or used otherwise, for example heating water. This "thermal siphon plenum" is a further energy conserving enhancement to the curtain wall of the present invention.

The net-zero curtain wall of the present disclosure is designed in a way such that a variety of existing building-architecture-related technologies can be incorporated easily into the curtain wall.

For example, PV cassettes with industry-standard (e.g., UL approved) wiring systems can be easily integrated in a curtain wall. The PV cassettes may comprise a combined PV and vision unit, such as PV glass units (PVGU) available from Pythagoras Solar.

Another example of a cassette/panel integrated with the curtain wall is an electrochromic unit. In the electrochromic unit, there might be multiple panes, where one or more panes may be made to have electrochromic properties at uniform or varying degrees relative to the other panes. The electrochromic units may be electrically connected to PV cells to provide power for operation.

In another example, a panel to be integrated with the curtain wall may be a vision unit, such as a R-20 glass unit. The vision unit may have multiple glazing and Heat Mirror® films, such as available from Southwall Technologies. Such integration may be useful to realize a curtain wall with high R-value. For example, a curtain wall configured according to certain embodiments of the present disclosure and including R-20 vision glass cassettes is expected to achieve an R-value of 12 or better.

Another example panel with specialized functionality that can be integrated with the curtain wall includes sunlighting units, such as available form SunCentral of Vancouver, Wash. These units are integrated into a curtain wall for directing sunlight into the interior of a building.

In yet another example, a building with a "living wall" can be realized by integrating units with live flora on the surface of the curtain wall. The "living wall" units may have built-in chambers for soil/nutrients that can be incorporated into cassettes for integration into a curtain wall according to certain embodiments of the present disclosure. This way the overall 'green' and/or 'organic' footprint of the curtain wall technology can be enhanced.

In summary, embodiments of the curtain wall of the present disclosure may be interfaced with building control systems for efficient control of building temperature and power production/consumption. For example, a control system may be interfaced with heat exchangers and electrochromic units in the curtain wall for efficient control of the interior building temperature.

By tuning the level of integration and/or taking advantage of the easy installation and interchangeability, various curtain wall configurations, for example, regular PV curtain walls, PV curtain walls with integrated sunscreens, and a PV dry screen curtain wall, each configuration with appropriate electrical wiring, may be combined with and integrated with the modular curtain walls of the present disclosure. The modular design of the curtain walls offer enhanced versatility and energy efficiency at an affordable price. The performance of the curtain walls may be tuned to meet energy efficiency and building construction standards in a variety of geographic regions. The curtain wall system accepts a variety of different cassettes and panels to promote a sustainable as well as 'flexible' overall configuration. In addition to structural and functional flexibility, the modular design opens up the possibility of accommodating a wide variety of aesthetic choices for the building exterior and interior—for example, the modular design allows for flexible mullion colors and a wide variety of glazing options.

The curtain wall system implemented by the embodiments of the present disclosure controls rain penetration, maintains ventilation, and provides thermal insulation.

Although the present invention has been particularly described with reference to certain embodiments thereof, it should be readily apparent to those of ordinary skill in the art that changes and modifications in the form and details may be made without departing from the spirit and scope of the invention.

What is claimed is:

1. A curtain wall for an energy efficient building comprising:
    a support frame;
    a grid assembly system attached to said support frame; and
    a multiplicity of panels and cassettes attached to said grid assembly system, said multiplicity of panels and cassettes each comprising a prefabricated unit attached to a frame;
    wherein said grid assembly system is configured for ease of attachment of said frames carrying said prefabricated units; and
    wherein said grid assembly system comprises vertical metal struts with steel pins, each of said steel pins comprising a cylindrical end and a spring-loaded plunger, said vertical metal struts with steel pins being configured to engage with said frames of said panels and cassettes, said cylindrical end being captured in a locking slot of said frame and said spring-loaded plunger being captured by a circular aperture in said frame.

2. The curtain wall as in claim 1, further comprising sheathing between said grid assembly system and said support frame.

3. The curtain wall as in claim 1, wherein said multiplicity of panels and cassettes are chosen from the group consisting of vision glass cassettes, electrochromic window cassettes, photovoltaic panels, spandrel panels, and aluminum metal panels.

4. The curtain wall as in claim 1, wherein said multiplicity of panels and cassettes includes a heat exchange panel.

5. The curtain wall as in claim 4, wherein said heat exchange panel is connected to an HVAC system of said energy efficient building.

6. The curtain wall as in claim 4, wherein said heat exchange panel is plumbed into a hot water system of said energy efficient building.

7. The curtain wall as in claim 1, wherein said panels and cassettes include a photovoltaic panel.

8. The curtain wall as in claim 1, wherein said photovoltaic panel is electrically connected to an electrical grid of said energy efficient building.

9. The curtain wall as in claim 1, wherein said support frame comprises tube steel.

10. The curtain wall as in claim 1, wherein said support frame comprises steel studs.

11. The curtain wall as in claim 1, wherein said grid assembly system comprises horizontal metal struts configured to couple with hooks attached at top and bottom edges of each of said frames of said panels and cassettes.

12. The curtain wall as in claim 1, further comprising gaskets between said panels and cassettes and said grid assembly system.

13. A curtain wall for an energy efficient building comprising:
    a support frame;
    a grid assembly system attached to said support frame;
    a multiplicity of panels and cassettes attached to said grid assembly system, said multiplicity of panels and cassettes each comprising a prefabricated unit attached to a frame; and
    a thermal siphon plenum;
    wherein said grid assembly system is configured for ease of attachment of said frames carrying said prefabricated units.

14. A method of assembling a curtain wall for an energy efficient building comprising:
    providing a support frame;
    attaching sheathing to the exterior side of said support frame;
    applying an exterior waterproofing membrane to the exterior side of said sheathing;
    attaching a grid assembly system to said support frame, said sheathing being positioned between said support frame and said grid assembly system; and
    attaching a multiplicity of cassettes and panels to said grid assembly system, said cassettes and panels each comprising a prefabricated unit attached to a frame;
    wherein said grid assembly system comprises horizontal metal struts configured to couple with hooks attached at top and bottom edges of each of said frames of said panels and cassettes and wherein said grid assembly system comprises vertical metal struts with steel pins, each of said steel pins comprising a cylindrical end and a spring-loaded plunger, said vertical metal struts with steel pins being configured to engage with said frames of said panels and cassettes, said cylindrical end being captured in a locking slot of said frame and said spring-loaded plunger being captured by a circular aperture in said frame.

15. The method as in claim 14, wherein sections of said curtain wall are preassembled before attaching to the exterior of said energy efficient building.

16. The method as in claim 14, further comprising, after completing assembly of said curtain wall, removing individual panels and cassettes without disturbing adjacent panels and cassettes.

17. The curtain wall as in claim 13, wherein said grid assembly system comprises vertical metal struts with steel pins, each of said steel pins comprising a cylindrical end and a spring-loaded plunger, said vertical metal struts with steel pins being configured to engage with said frames of said panels and cassettes, said cylindrical end being captured in a locking slot of said frame and said spring-loaded plunger being captured by a circular aperture in said frame.

18. The curtain wall as in claim 13, wherein said grid assembly system comprises horizontal metal struts configured to couple with hooks attached at top and bottom edges of each of said frames of said panels and cassettes.

* * * * *